US 6,997,059 B2
Feb. 14, 2006

(12) United States Patent
Ernsberger et al.

(54) PRESSURE SENSOR (75) Inventors: Craig Ernsberger, Granger, IN (US); Jason Langhorn, South Bend, IN (US)

(73) Assignee: CTS Corporation, Elkhart, IN (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/846,759

(22) Filed: May 14, 2004

(65) Prior Publication Data

US 2005/0072245 A1 Apr. 7, 2005

Related U.S. Application Data (63) Continuation-in-part of application No. 10/716,752, filed on Nov. 19, 2003.

(60) Provisional application No. 60/509,287, filed on Oct. 7, 2003.

(51) Int. Cl.
*G01L 9/00* (2006.01)

(52) U.S. Cl. ..................... 73/753; 361/283.1

(58) Field of Classification Search ............. 73/754, 73/706, 708, 719, 720, 725, 726; 361/283.1
See application file for complete search history.

(56) References Cited

U.S. PATENT DOCUMENTS

| 4,072,058 A | * | 2/1978 | Whitehead, Jr. ........... 73/720 |
| 4,321,578 A | * | 3/1982 | Nagasu et al. ............ 338/42 |
| 4,527,428 A | * | 7/1985 | Shimada et al. ........... 73/721 |
| 4,536,820 A | * | 8/1985 | Binder et al. ............ 361/283.1 |
| 4,542,435 A | * | 9/1985 | Freud et al. ............. 361/283.4 |
| 4,546,653 A | * | 10/1985 | Tobita et al. ............ 73/720 |
| 4,587,840 A | | 5/1986 | Dobler et al. |
| 4,932,266 A | * | 6/1990 | Bauer et al. ............. 73/727 |
| 5,197,334 A | | 3/1993 | Guziak |
| 5,209,122 A | | 5/1993 | Matly et al. |
| 5,317,920 A | | 6/1994 | Kremidas |
| 5,587,535 A | | 12/1996 | Sasaki et al. |
| 5,867,886 A | | 2/1999 | Ratell et al. |
| 5,898,359 A | | 4/1999 | Ellis |
| 5,939,637 A | | 8/1999 | Pitzer et al. |
| 5,948,989 A | | 9/1999 | Ichikawa et al. |
| 6,003,379 A | | 12/1999 | Ichikawa et al. |
| 6,003,380 A | | 12/1999 | Sasaki et al. |
| 6,022,756 A | | 2/2000 | Sparks et al. |
| 6,176,137 B1 | | 1/2001 | Sasaki et al. |
| 6,267,010 B1 | | 7/2001 | Hatanaka et al. |

(Continued)

FOREIGN PATENT DOCUMENTS

DE 40 33 707 A1 4/1992

(Continued)

*Primary Examiner*—Edward Lefkowitz
*Assistant Examiner*—Andre Allen
(74) *Attorney, Agent, or Firm*—Mark P. Bourgeois (57) ABSTRACT A pressure sensor for sensing a pressure level of a pressurized medium. In one embodiment, the pressure sensor has a high pressure side and a low pressure side. An aperture may extend through at least a portion of the sensor assembly, and a seal is located in the aperture. The seal seals the high pressure side from the low pressure side. Electrical leads extend through the seal between the high pressure side and the low pressure side. A substrate is located on the high pressure side. A pressure sensitive resistor is mounted on the substrate such that the resistor is directly exposed to the pressurized medium. The resistor changes resistance in response to a change in pressure. The resistor is connected to the electrical leads.

31 Claims, 9 Drawing Sheets

U.S. PATENT DOCUMENTS

| | | |
|---|---|---|
| 6,269,534 B1 | 8/2001 | Mattmann et al. |
| 6,725,514 B1 | 4/2004 | Moyer et al. |
| 6,782,755 B1 * | 8/2004 | Tai et al. ...................... 73/754 |

FOREIGN PATENT DOCUMENTS

| | | |
|---|---|---|
| GB | 2 187 888 A | 9/1987 |

* cited by examiner

PRESSURE SENSOR

CROSS REFERENCE TO RELATED AND CO-PENDING APPLICATIONS

This application is a continuation in part of U.S. patent application Ser. No. 10/716,752 filed on Nov. 19, 2003 and titled, "Pressure Sensor".

PRIORITY

This application claims priority from U.S. Provisional Patent Application No. 60/509,287, filed Oct. 7, 2003, the entirety of which is incorporated by reference.

BACKGROUND

The present invention relates to pressure sensors in general and in particular to a pressure sensor that eliminates the use of a diaphragm between the sensor and pressure to be measured.

Conventional devices for high pressure measurement in severe environments rely on a diaphragm in conjunction with a pressure sensing element. Various pressure sensing elements have been used such as strain gages, piezoresistive devices and semiconductor based sensing elements. These devices are constructed such that the diaphragm is positioned between the pressurized process media and the pressure sensing element. The diaphragms are subject to mechanical fatigue and therefore limit the service life of conventional high pressure sensors. A diaphragm free high pressure sensor as presented herein is therefore desirable.

SUMMARY OF THE INVENTION

It is a feature of the present invention to provide a pressure sensor for sensing pressure of a media and providing an electrical signal that is indicative of the pressure level.

In one embodiment of the present invention it is a feature to provide a pressure sensor assembly for attachment to a pressure vessel that includes a high pressure side and a low pressure side. An aperture may be located in at least a portion of the sensor assembly and a seal is located in the aperture. The seal seals the high pressure side from the low pressure side. Electrical leads extend through the seal between the high pressure side and the low pressure side. The sensor assembly may also include a substrate located on the high pressure side. A pressure sensitive resistor is mounted on the substrate such that the resistor is exposed to a pressurized medium. The resistor changes resistance in response to a change in pressure. The resistor is electrically connected to the electrical leads.

BRIEF DESCRIPTION OF THE DRAWINGS

It is noted that the drawings of the invention are not to scale. In the drawings, like numbering represents like elements among the drawings.

DETAILED DESCRIPTION

Referring to FIGS. 1–7, one embodiment of a pressure sensor assembly 20 is shown. Pressure sensor assembly 20 has a high pressure side 23 and a low pressure side 24. Pressure sensor assembly 20 includes a housing 22, a hexagonal shaped portion 26, an insert 36, a threaded portion 42 and a connector shroud 110. Hexagonal shaped portion 26 has opposing ends 27 and 28 and several flat surfaces 31 located on the outside of hexagonal portion 26 so that a wrench can rotate the sensor assembly. An aperture 29 extends through the center of portion 26 and includes a counterbore having a step 30. A flange 32 extends from end 27. Hexagonal portion 26 can be made out of a metal such as stainless steel.

Insert 36 has a rim 37, ends 38 and 39 and a bore 45 extending through the insert. The insert 36 fits into aperture 29 with rim 37 bearing on step 30. Insert 36 can be made out of a metal such as stainless steel. Alternatively, Insert 36 can be made from a material selected to optimize a particular type of glass to metal seal. For example, Inconel is often used to make compression seals while Kovar, a low expansion alloy is often used to make a matched seal. Insert 36 may be attached to portion 26 by a weld 122 such as a laser weld.

Threaded portion 42 is attached to insert 36 after the substrate 70, is attached to the welded insert 36. Threaded portion 42 has ends 43 and 44 and a bore 45a extending through threaded portion 42. Bore 45a aligns with bore 45 in insert 36 when the sensor assembly is assembled. Threaded portion 42 also includes external threads 46 that are used to attach the pressure sensor to a pressure vessel (not shown). Threaded portion 42 can be made out of a metal such as stainless steel. Threaded portion 42 is attached to insert 36 by a weld 120. A tube (not shown on drawing) may be inserted into bores 45 and 45A to facilitate making this weld in a manner consistent with durability requirements of the sensor. A seal ring 47 is located at end 44. Seal ring 47 is used to seal the pressure sensor to a pressure vessel.

Figure 5:
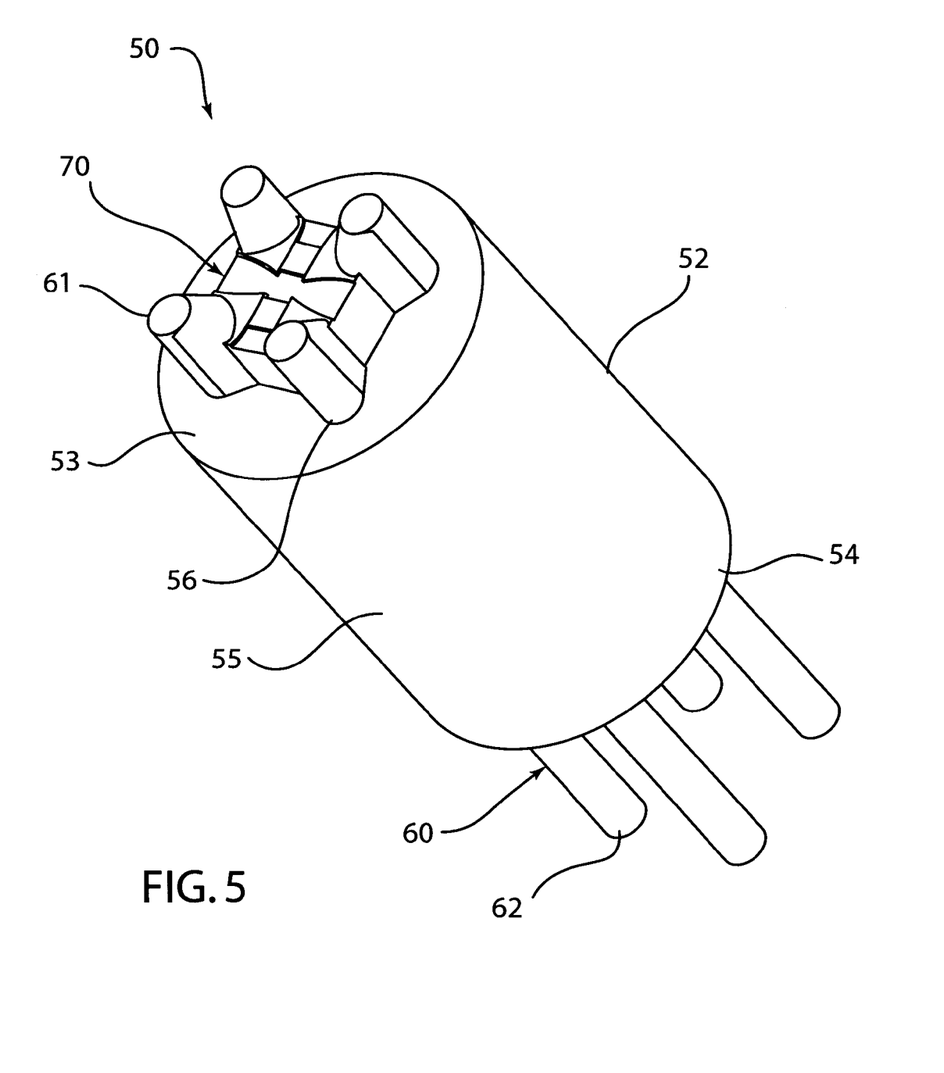
FIG. 5 is a perspective view of a glass seal assembly.

A glass seal assembly 50 is located inside of bore 45 of insert 36. As best shown in FIG. 5, glass seal assembly 50 has a glass insert 52, ends 53 and 54, an outer surface 55 and four holes 56. Glass insert 52 is sintered into bore 45 so that the outer surface 55 makes a bond or glass to metal seal to the surface of bore 45. Glass seal assembly 50 also includes metal pins or electrical leads 60 with each pin being located in the corresponding hole 56. Each pin 60 has opposite ends 61 and 62 that extend beyond both sides of glass insert 52. Pins 60 would typically be gold plated and held in place by sintered glass insert 52. The bonds of glass insert 22 to bore 45 and pins 60 create a hermetic seal between high pressure side 23 and low pressure side 24.

Figure 6:
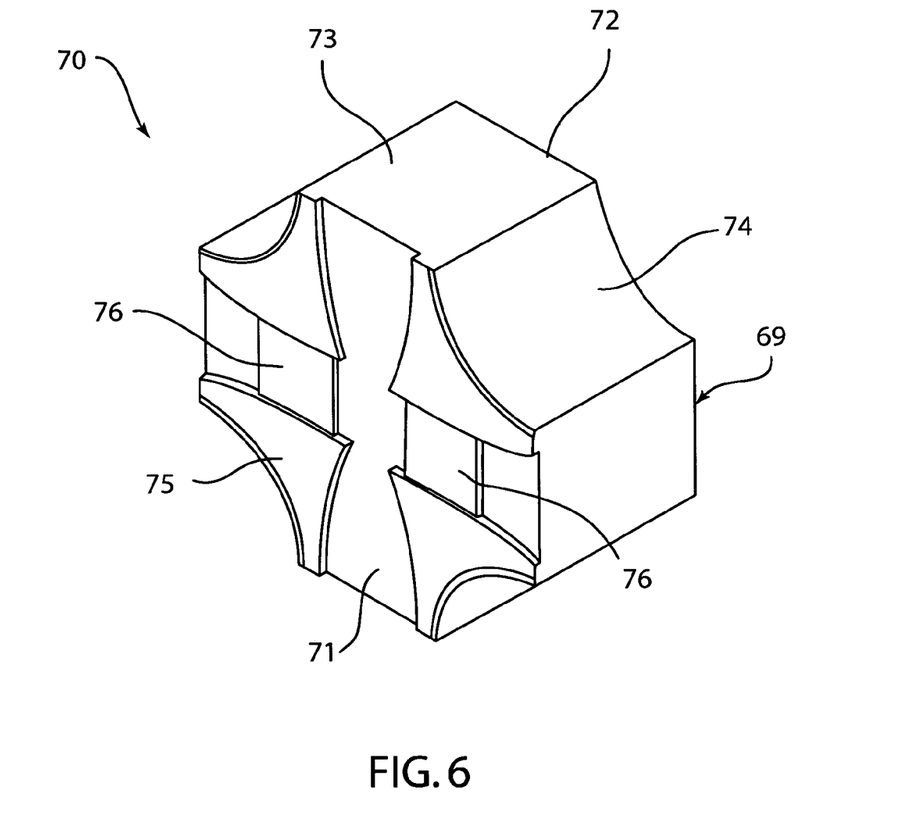
FIG. 6 is a perspective view of a sensor with pressure sensitive resistors.

A sensor 70 is mounted to end 53 of glass insert 52. Referring to FIG. 6, sensor 70 has a substrate 69 with a medium contacting end 71, a mounting end 72 and sides 73. Substrate 69 can be an alumina ceramic, low temperature co-fired ceramic, glass or a metal with an applied dielectric surface. Substrate 69 also has castellations 74, conductor pads 75 and pressure sensitive resistors 76. The castellations 74 and conductor pads 75 are formed from an electrically conductive and solderable material. Each pressure sensitive resistor 76 is located between two conductor pads 75 on end 71. Pressure sensitive resistors 76 are exposed to the pressurized medium. Resistors 76 can be conventional thick film resistors that are manufactured using conventional thick film processing techniques. A preferred resistor composition is Heraeus 8241 resistor material which is commercially available from Heraeus Corporation of West Conshohocken, Pa. Resistors 76 can also be thin film resistors.

Further information on the manufacture and processing of resistors 76 can be found in U.S. patent application Ser. No. 10/716,752. The contents of which are herein incorporated by reference in entirety.

Figure 7:
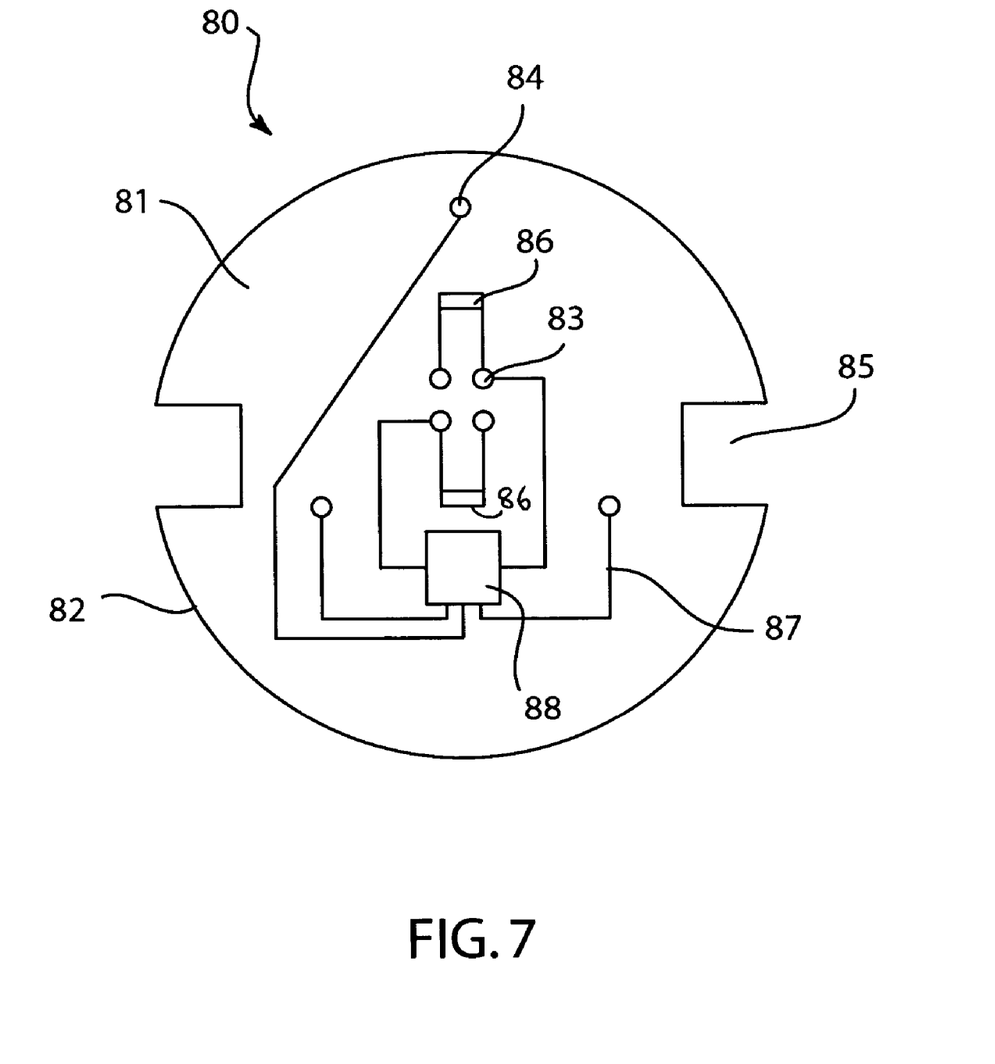
FIG. 7 is a top view of a printed circuit board.

Pins 60 extend through aperture 29 and mate with plated through holes 83 in printed circuit board 80. Pins 60 are preferably soldered in plated through holes 83. An adhesive disk 78 is sticky on both sides and holds printed circuit board 80 to end 27 of hexagonal portion 26.

Figure 8:
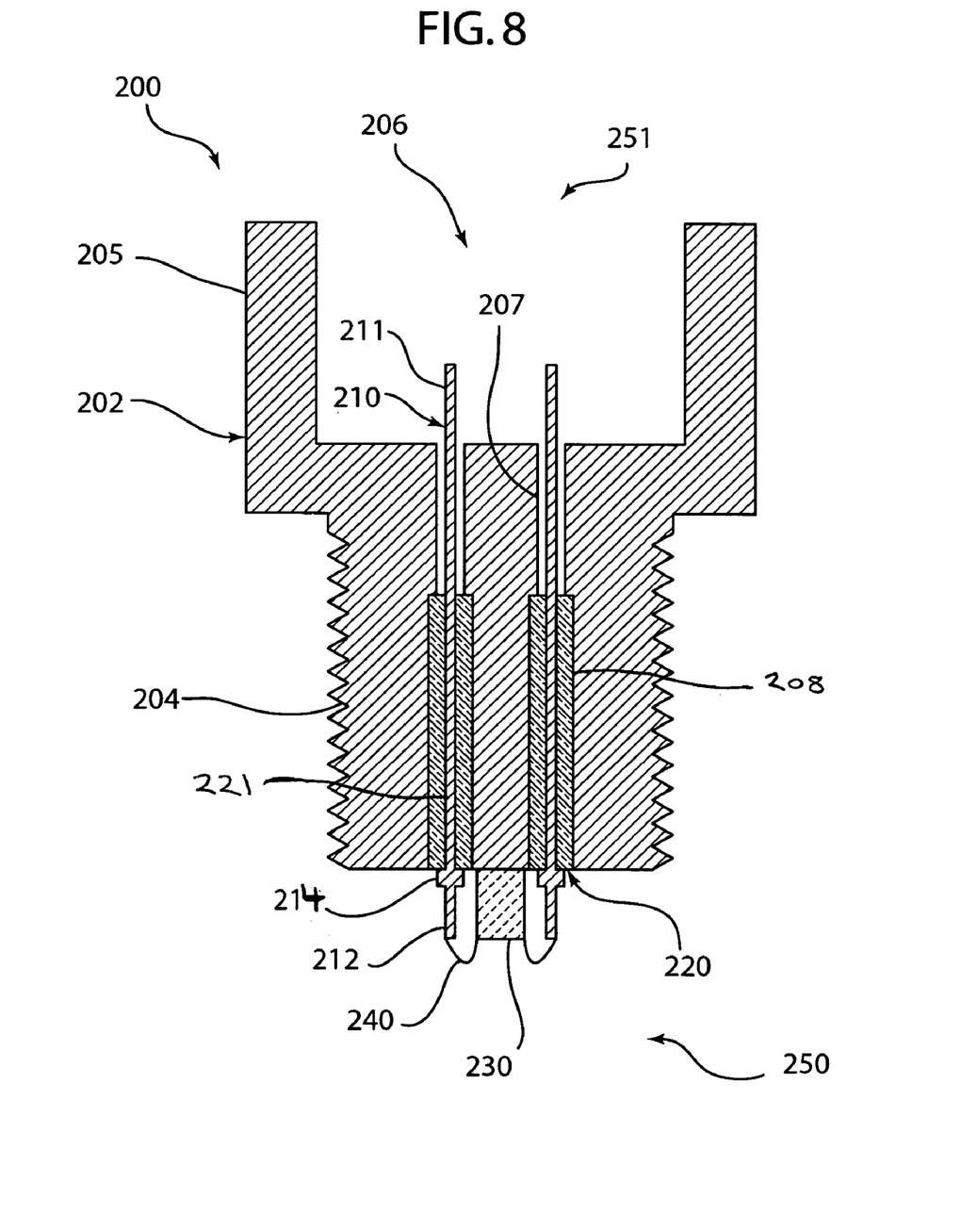
FIG. 8 is a cross-sectional view of another embodiment of a pressure sensor taken along a line similar to that of FIG. 4.

Now referring to FIG. 8, printed circuit board 80 has a top side 81, bottom side 82, terminal holes 84 and notches 85. A pair of reference resistors 86 and an integrated circuit 88 are mounted on top side 81. Integrated circuit 88 is used to condition and amplify an electrical signal coming from resistors 76 and 86. Integrated circuit 88 can also contain circuitry for calibration and temperature compensation.

Circuit lines 87 connect pins 60, reference resistors 86 and an integrated circuit 88. Two pressure sensitive resistors 76 and two reference resistors 86 are connected to form a conventional Wheatstone bridge. In the Wheatstone bridge, resistors 76 are the sensing resistors and resistors 86 are the reference resistors whereby resistors 76 change resistance in response to pressure changes, and resistors 86 have a relatively constant value as they are not exposed to changes in pressure.

A voltage is applied across the Wheatstone bridge and the voltage drop across the bridge is measured. The pressure level is proportional to the bridge voltage.

Figure 1:
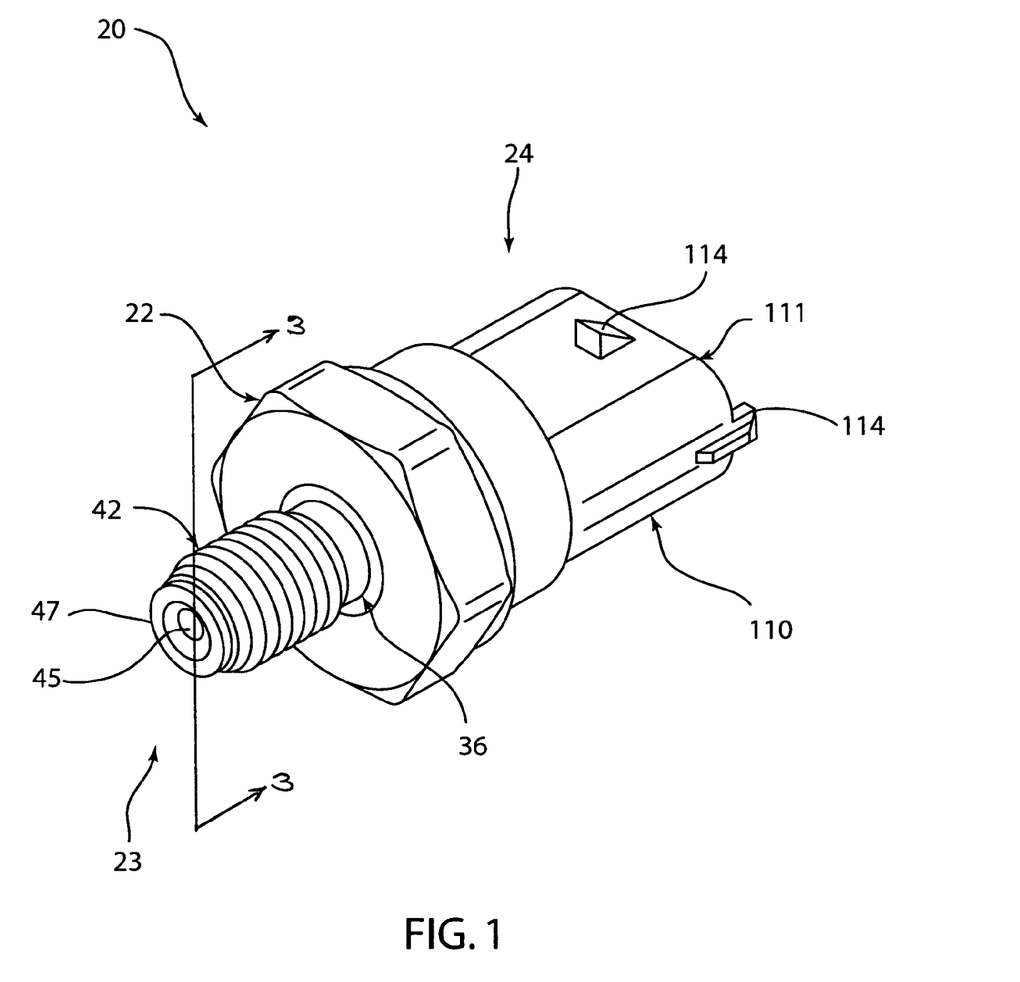
FIG. 1 is a perspective view of a pressure sensor.
Figure 2:
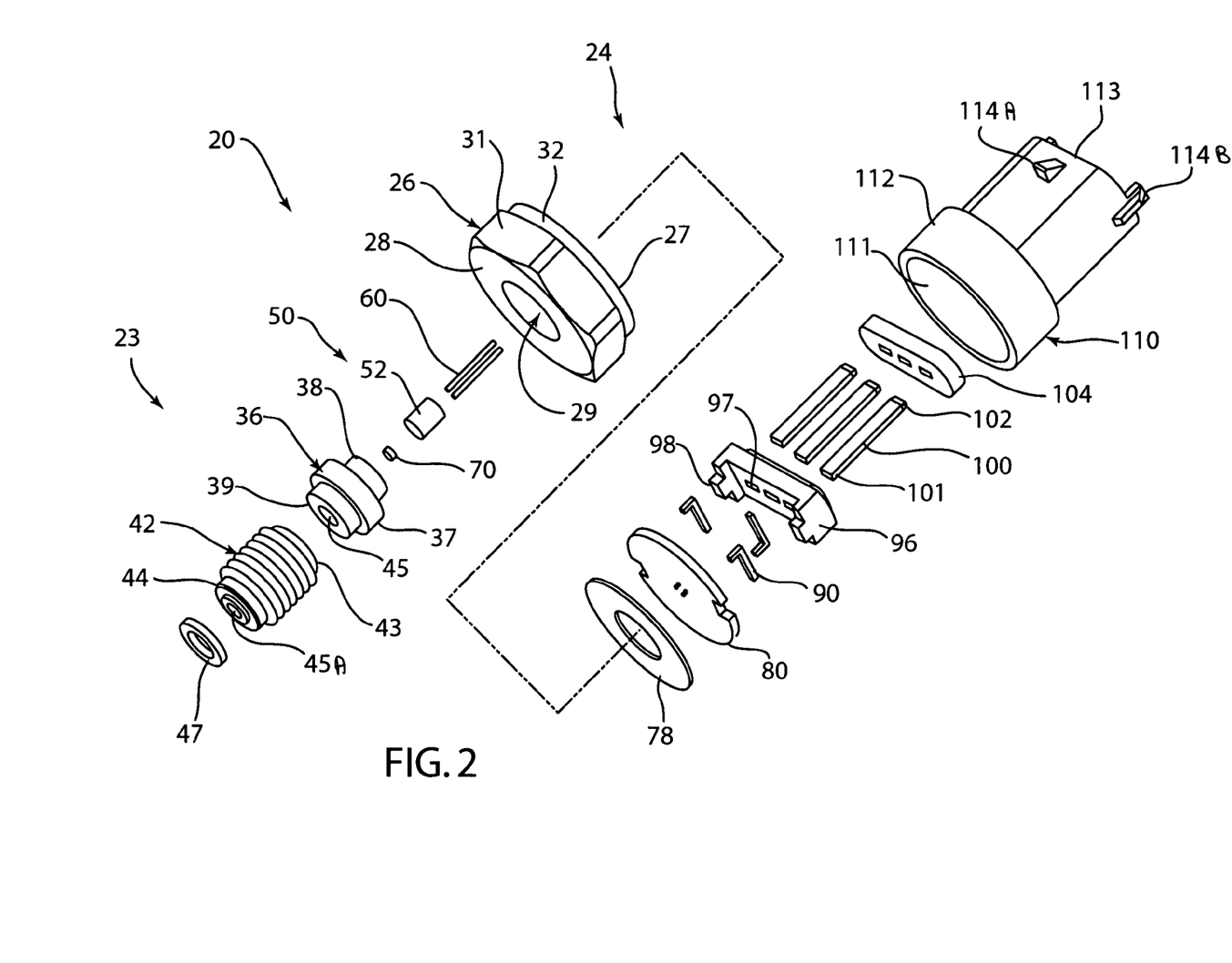
FIG. 2 is an exploded view of the pressure sensor of FIG. 1.
Figure 3:
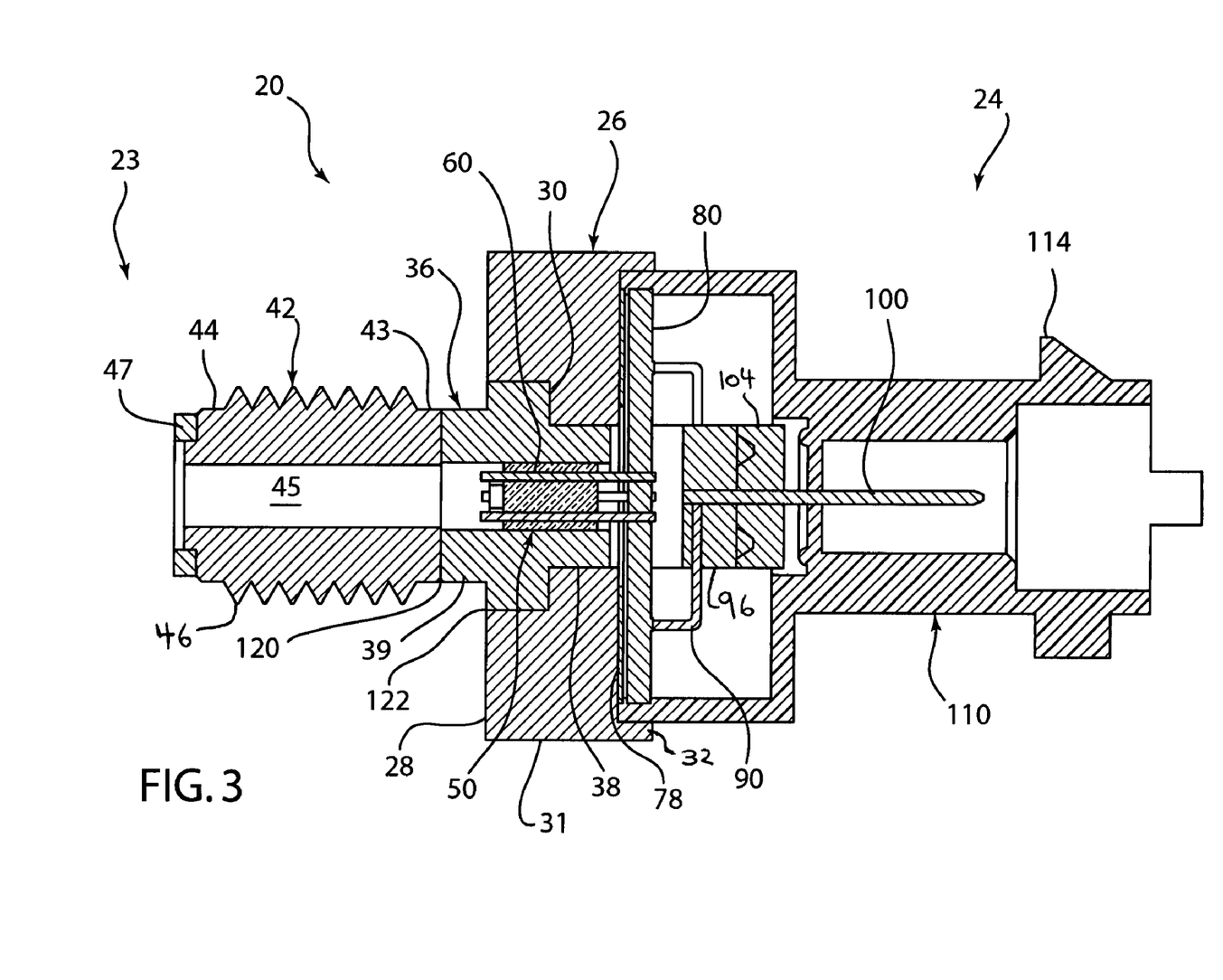
FIG. 3 is a cross-sectional view of the pressure sensor taken along line 3—3 of FIG. 1.
Figure 4:
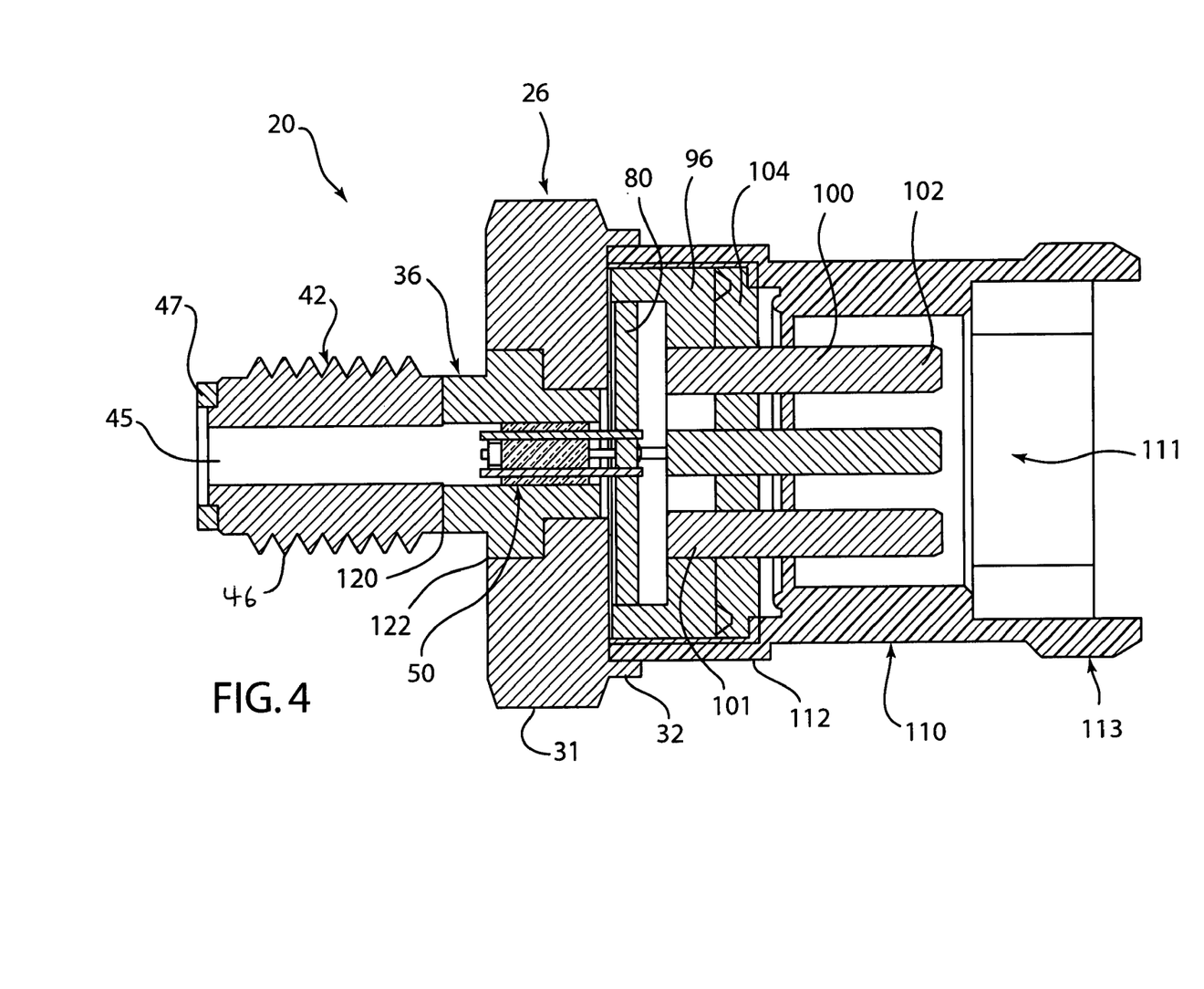
FIG. 4 is another cross-sectional view of the pressure sensor of FIG. 1 taken at 90° from line 3—3.

Sensor assembly 20 also includes three transfer terminals 90 that are held by a terminal carrier 96 (FIG. 2). Terminal carrier 96 has holes 97 and posts 98. Terminal carrier 96 is mounted over printed circuit board 80 with posts 98 fitted into notches 85 of printed circuit board 80. Each transfer terminal 90 has one end soldered into the corresponding terminal holes 84.

Connector terminals 100 are mounted in holes 97. Each connector terminal 100 has opposite ends 101 and 102, and each connector terminal end 101 is in electrical contact with the respective transfer terminal 90. Connector terminals 100 supply a voltage to the resistors and allow an output signal to be transmitted from the pressure sensor.

The connector shroud 110 is mounted over terminals 100, terminal carrier 96 and printed circuit board 80. Connector shroud 110 protects the terminals and printed circuit board. Connector shroud 110 can be a molded plastic material. The connector shroud has a cavity 111, ends 112, 113 and latch tabs 114a, 114b. End 112 is press fit into flange 32 of hexagonal portion 26. Seal 104 is located between terminal carrier 96 and connector shroud 110. Seal 104 prevents contamination from outside the connector shroud from entering the area of the printed circuit board. Latch tabs 114a, 114b are designed to retain an external wiring harness (not shown). The wiring harness would mate with terminals 100 at ends 102 and would connect to another external electronic circuit (not shown).

In operation, resistors 76 change resistance in response to the applied pressure level. In one embodiment, the resistance across each resistor 76 is about 4100 ohms when the pressurized medium is at 0 pounds per square inch and the resistance across each resistor 76 is about 3600 ohms when the pressure is at 50,000 pounds per square inch. The resistance value is linear with pressure.

Pressure sensor assembly 20 is useful for measuring large changes in pressure and for use with high pressures. This is due to the fact that the resistance change with pressure is small over a small pressure range. It is believed that pressure sensor 20 is more effective with pressure ranges above 500 pounds per square inch. however, it may also be used to detect pressures down to 0 pounds per square inch (gauge pressure).

Pressure sensor 20 can be assembled in the following sequence:
1. Glass insert 52 is placed in bore 45 of insert 36.
2. Pins 60 are placed in holes 56.
3. The pins 60, glass insert 52 and insert 36 are placed in an oven at 1000 degree Centigrade where the glass adheres to the pins and insert forming a glass to metal seal.
4. Sensor 70 is placed on side 53 with pin ends 61 adjacent to castellations 74.
5. Solder paste is placed on each pin end 61.
6. The insert 36 with sensor 70 is placed in an oven to reflow the solder paste to make an electrical connection between pin ends 61 and the corresponding castellations 74.
7. Insert 36 is placed in hexagonal portion 26 and laser welded in place with weld 122.
8. Threaded portion 42 is placed next to insert 36 and laser welded in place with weld 120.
9. Seal ring 47 is placed on end 44 of the threaded portion.
10. Adhesive disc 78 is placed on end 27.
11. Circuit board 80 is mounted over adhesive disk 78 with pin ends 62 extending through plated through holes 83.
12. Pin ends 62 are soldered in plated through holes 83.
13. Transfer terminals 90 are soldered into terminal holes 84.
14. Connector terminals 100 are inserted in terminal carrier 96.
15. Terminal carrier 96 is placed over printed circuit board 80 with posts 98 engaged in notches 85. Connector terminals 100 are in contact with transfer terminals 90.
16. Seal 104 is placed over connector terminals 100.
17. Connector shroud 110 is placed over connector terminals 100 with end 112 press fit into flange 32.

Second Embodiment

Referring to FIG. 8, another embodiment of a pressure sensor assembly 200 is shown. Pressure sensor assembly 200 has a housing 202. Housing 202 has a high pressure side 250 and a low pressure side 251. Housing 202 is formed from a unitary piece of stainless steel. Housing 202 has threads 204, flat surfaces 205, a cavity 206 and bores 207. Each bore 207 has a step portion 208.

A glass insert 220 is located inside of each bore 207 and extends up to step portion 208. Each glass insert 220 has a hole 221 extending through the center. Glass inserts 220 are sintered to make a bond with the surface of the corresponding bore 207. A portion of bores 207 above step portions 208 is not filled with glass insert 220.

Metal pins 210 are located in corresponding holes 221 and bores 207. Pins 210 each have ends 211 and 212 and a header 214. Each header 214 rests on the corresponding glass insert 220. Pins 210 would typically be gold plated. Pins 210 are held in place by the corresponding sintered glass insert 220. The bonds of glass insert 220 to bore 207 and pins 210 create a hermetic seal between the high pressure side 250 and low pressure side 251.

Header 214 and step 208 help to prevent the pressurized medium from causing any movement of the pins or glass insert.

A sensor 230 is mounted to the high pressure side 250 of housing 202. Sensor 230 is similar to sensor 70 of FIG. 6, except that the castellations have been omitted.

Sensor 230 has pressure sensitive resistors and conductor pads (not shown). The conductor pads are connected to pin ends 212 by a wire bond 240. Pin ends 211 can be connected to an external electrical circuit (not shown) or can be connected to a printed circuit board containing signal conditioning circuitry for calibration and temperature compensation similar to printed circuit board 80.

Pressure sensor 200 can be assembled as follows:
1. Glass inserts 220 and pins 210 are placed in bores 207 of housing 202.
2. Housing 202, glass inserts 220 and pins 210 are placed in an oven at 1000 degree Centigrade where the glass adheres to the pins and housing forming a glass to metal seal.
3. Sensor 230 is mounted to housing 202.
4. Wire bonds 240 are placed between sensor 230 and pin ends 212.

Third Embodiment

Figure 9:
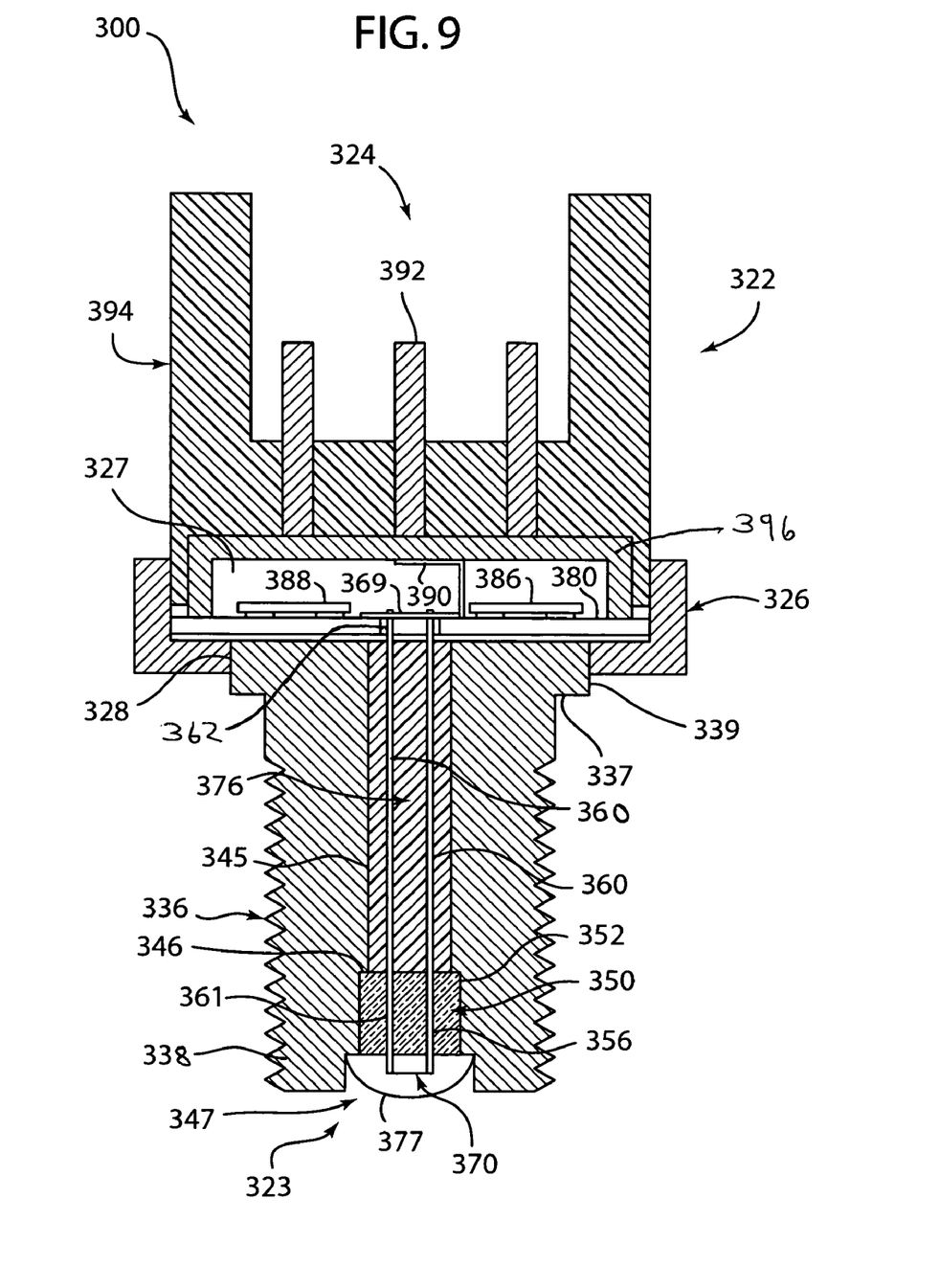
FIG. 9 is a cross-sectional view of a third embodiment of a pressure sensor taken along a line similar to that of FIG. 4.

Referring to FIG. 9, another embodiment of a pressure sensor assembly 300 is shown. Pressure sensor assembly 300 has a high pressure side 323 and a low pressure side 324, and includes a hexagonal portion 326, a threaded portion 336 and a connector shroud 394. Hexagonal portion 326 has flat surfaces 329, a cavity 327 and a hole 328. Threaded portion 336 has a rim 337, ends 338 and 339, a bore 345, a step 346 and a cavity 347. Hexagonal portion 326 and threaded portion 336 are formed from stainless steel. Threaded portion 336 is mounted into hole 328. Rim 339 is welded to hexagonal portion 326.

A glass insert assembly 350 is located inside of cavity 347. Glass insert assembly 350 has a glass insert 352, metal pins 360 and a sensor 370. Glass insert 352 has holes 356 extending through the center. The outer surface of the glass insert makes a bond to the surface of cavity 347 when sintered.

Metal pins 360 are located in holes 356. Pins 360 extend through bore 345. Pins 360 in bore 345 are surrounded by an epoxy 376. Pins 360 have ends 361 and 362. Pins 360 would typically be gold plated. Pins 360 are held in place by sintered glass insert assembly 350. The bonds of glass insert 352 to cavity 347 and metal pins 360 create a hermetic seal between high pressure side 323 and low pressure side 324.

Sensor 370 is mounted to glass insert assembly 350. Sensor 370 is identical to sensor 70 of FIG. 6. Pin end 361 is soldered to castellations 74 in order to make an electrical connection with pressure sensitive resistors 76. A covercoat 377 is placed over sensor 370 in cavity 347. Covercoat 377 can be an organic covercoat such as preflorinated polyether or can be silicone. The covercoat protects the resistors from corrosive environments while at the same time allowing the resistors to be compressed by the applied pressure of the medium.

Pin ends 362 are connected to metal leads 369. Metal leads 369 in turn are connected to pads (not shown) on a printed circuit board 380. Pin ends 362 would be soldered to metal leads 369

Printed circuit board 380 is mounted in cavity 327. Printed circuit board 380 has a pair of trim resistors 386 and an integrated circuit 388 mounted on one side. Integrated circuit 388 is used to condition and amplify an electrical signal coming from the pressure sensitive resistors. Integrated circuit 388 can also contain circuitry for calibration and temperature compensation.

Printed circuit board 380 contains circuit lines (not shown) to interconnect the pins, trim resistors and integrated circuit. The two pressure sensitive resistors and two trim resistors are connected to form a conventional Wheatstone bridge.

Three transfer terminals 390 and connector terminals 392 are held by a terminal carrier 396. One end of each transfer terminal 390 is soldered to printed circuit board 380 and the other end of each transfer terminal is in electrical contact with the corresponding connector terminal 392.

A connector shroud 394 is mounted around terminals 392 and over terminal carrier 396. Connector shroud 394 protects the terminals and printed circuit board. Connector shroud 394 can be a molded plastic material. Connector shroud 394 fits into cavity 327 of threaded member 336. Connector shroud 394 is configured to mate with a wiring harness (not shown) that would connect to another external electronic circuit (not shown).

Pressure sensor 300 can be assembled as follows:
1. Glass insert 352 is placed in bore 345 of threaded portion 336.
2. Pins 360 are placed in holes 356.
3. The pins 360, glass insert 352 and threaded portion 336 are placed in an oven at 1000 degrees Centigrade where the glass adheres to the pins and housing forming a glass to metal seal.
4. Sensor 370 is placed into cavity 347 on glass insert side 352 with pin ends 361 adjacent to castellations 74.
5. Solder paste is placed on pin ends 361.
6. Threaded portion 336 with sensor 70 is placed in an oven to reflow the solder paste to make an electrical connection between pin ends 361 and castellations 74.
7. Threaded portion 336 is placed in hole 328 of hexagonal portion 326 and laser welded in place.
8. Covercoat 377 is placed over sensor 70 in cavity 347 and cured.
9. Printed circuit board 380 is mounted in cavity 327 with pin ends 362 extending through circuit board 380.
10. Leads 369 are soldered to pin ends 362 and to pads (not shown) on the printed circuit board 380.
11. Transfer terminals 390 are soldered to circuit board 380.
12. Connector terminals 392 are inserted in respective holes in terminal carrier 396.
13. Terminal carrier 396 is placed over circuit board 380. Connector terminals 392 are in contact with transfer terminals 390.
14. Connector shroud 394 is placed over connector terminals 392.

While the invention has been taught with specific reference to these embodiments, someone skilled in the art will recognize that changes can be made in form and detail without departing from the spirit and the scope of the invention. For example, the embodiments of the pressure sensor assembly depicted include an external threaded portion that may be used to insert the sensor assembly into the wall of a pressure vessel; however, internal threads may be provided to attach the assembly to an outlet fitting on the pressure vessel. In addition, instead of using a threaded portion, the pressure assembly may also be welded into a pressure vessel or may be inserted completely within the confines of the pressurized medium. If the sensor assembly is inserted completely within the pressurized medium, it need not necessarily have a high pressure side and a low pressure side. Also, the electrical leads or pins have been shown extending through the glass seal insert, the leads may be otherwise electrically insulated such as with an insulated coating and placed at the outside of the seal insert. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pressure sensor assembly having a high pressure side and a low pressure side for attachment to a pressure vessel comprising:
    a) an aperture extending through at least a portion of the sensor assembly;
    b) a seal located in the aperture, the seal sealing the high pressure side from the low pressure side;
    c) a plurality of electrical leads extending through the seal between the high pressure side and the low pressure side;
    d) a substrate located on the high pressure side; and
    e) a least one pressure sensitive resistor mounted on the substrate such that the resistor is exposed to a pressurized medium, the resistor adapted to change resistance in response to a change in pressure, the resistor connected to the electrical leads.

2. The pressure sensor assembly according to claim 1, wherein the high pressure side includes a threaded portion.

3. The pressure sensor assembly according to claim 1, wherein the electrical leads have a first and a second end, the first end being connected to the resistors.

4. The pressure sensor assembly according to claim 3, wherein the second ends are connected to an electronic circuit.

5. The pressure sensor assembly according to claim 3, wherein the second ends are connected to a printed circuit board.

6. The pressure sensor assembly according to claim 3, wherein the resistor has conductor pads attached to both ends, the conductor pads located on the substrate.

7. The pressure sensor assembly according to claim 6, wherein the conductor pads are attached to the electrical leads by solder.

8. The pressure sensor assembly according to claim 6, wherein the conductor pads are attached to the electrical leads by a wire bond.

9. The pressure sensor assembly according to claim 1, wherein the seal includes a glass insert that is sintered into the aperture.

10. A pressure sensor assembly for sensing a pressure level of a pressurized medium, the sensor assembly having a high pressure side and a low pressure side, comprising
    a) an aperture extending through at least a portion of the assembly;
    b) a glass seal located in the aperture, the seal sealing the high pressure side from the low pressure side;
    c) a plurality of electrical leads extending through the glass seal between the high pressure side and the low pressure side, the electrical leads having a first end extending into the high pressure side and a second end extending into the low pressure side;
    d) first and second pressure sensitive resistors mounted on the high pressure side and electrically connected to the first end of the electrical leads, the resistors being exposed to the pressurized medium, the resistors adapted to change resistance in response to the pressure level of the pressurized medium and provide an electrical signal indicative of the pressure level; and
    e) an electronic circuit connected to the second ends of the electrical leads, the electronic circuit adapted to condition the electrical signal.

11. The pressure sensor assembly according to claim 10, wherein the sensor is devoid of a diaphragm.

12. The pressure sensor assembly according to claim 10, further including a ceramic substrate mounted on the high pressure side located between the first ends of the electrical leads.

13. The pressure sensor assembly according to claim 12, wherein the ceramic substrate has first, second, third and fourth metal castellations.

14. The pressure sensor assembly according to claim 13, wherein the first pressure sensitive resistor is connected between the first and second castellations, the second pressure sensitive resistor being connected between the third and fourth castellations.

15. The pressure sensor assembly according to claim 10, wherein the second end of the electrical leads are connected to a printed circuit board.

16. The pressure sensor assembly according to claim 15, further including a terminal carrier and a plurality of terminals connected to the printed circuit board.

17. The pressure sensor assembly according to claim 16, further including a connector shroud, the terminals extending into the connector shroud.

18. A pressure sensor assembly having a high pressure side and a low pressure side comprising:
    a) a seal mounted between the high and low pressure sides;
    b) a plurality of electrical leads extending between the high and low pressure sides;
    c) a pressure sensitive resistor mounted on the high pressure side, the pressure sensitive resistor being exposed to a pressurized medium, the resistor having first and second ends, the first end connected to a first electrical lead and the second end connected to a second electrical lead.

19. The pressure sensor assembly according to claim 18, wherein the electrical leads extend through the seal.

20. The pressure sensor assembly according to claim 18, wherein the seal is a sintered glass seal, and the electrical leads extend through holes in the glass seal.

21. A pressure sensor assembly comprising:
    a) an aperture extending through at least a portion of the sensor assembly;
    b) an insert mounted in the aperture, the insert having a first end and a second end;
    c) a plurality of insulated electrical leads extending through the insert beyond the first and second ends;
    d) a threaded portion for mounting the sensor assembly; and
    e) at least one pressure sensitive resistor connected to the electrical leads.

22. The pressure sensor assembly according to claim 21, including two of the pressure sensitive resistors and two reference resistors connected together to form a Wheatstone bridge.

23. The pressure sensor assembly according to claim 21, wherein the insert includes a glass seal to insulate the electrical leads.

24. The pressure sensor assembly according to claim 23, wherein a substrate is mounted to the glass seal.

25. The pressure sensor assembly according to claim 24, wherein the pressure sensitive resistor is mounted to the substrate.

26. A pressure sensor assembly comprising:
  a) a substrate having a plurality of conductor pads attached thereto;
  b) at least one pressure sensor sensitive resistor mounted on the substrate, such that the resistor is exposed to a pressurized medium, the resistor adapted to change resistance in response to a change in pressure, and the resistor electrically connected between a pair of the conductive pads;
  c) a plurality of electrical leads, each lead having a first end and a second end, the first end of each lead being connected to one of the conductive pads;
  d) a shroud; and
  e) an electrical circuit connected to the second ends of the electrical leads, the electronic circuit adapted to condition the electrical signal, the shroud covering the electrical circuit.

27. The pressure sensor assembly according to claim 26, wherein the electronic circuit includes two of the pressure sensitive resistors, and two reference resistors, the pressure sensitive resistors and the reference resistors connected together to form a Wheatstone bridge.

28. The pressure sensor assembly according to claim 26, wherein the electronic circuitry includes calibration and temperature compensation.

29. The pressure sensor assembly according to claim 26, further including a mounting portion, the mounting portion including a threaded member configured to mount the sensor assembly to a pressure vessel.

30. The pressure sensor assembly according to claim 29, wherein the mounting portion includes an aperture extending at least partially therethrough and a seal located in the aperture.

31. The pressure sensor assembly according to claim 30, wherein the substrate and the electronic circuit are located on opposite sides of the seal.

* * * * *